US012369623B2

(12) United States Patent
Rogan et al.

(10) Patent No.: US 12,369,623 B2
(45) Date of Patent: Jul. 29, 2025

(54) AEROSOL GENERATING DEVICE

(71) Applicant: JT International SA, Geneva (CH)

(72) Inventors: Andrew Robert John Rogan, Forres (GB); Alec Wright, Guildford (GB)

(73) Assignee: JT International SA, Geneva (CH)

( * ) Notice: Subject to any disclaimer, the term of this patent is extended or adjusted under 35 U.S.C. 154(b) by 437 days.

(21) Appl. No.: 18/040,162

(22) PCT Filed: Jul. 28, 2021

(86) PCT No.: PCT/EP2021/071216

§ 371 (c)(1),
(2) Date: Feb. 1, 2023

(87) PCT Pub. No.: WO2022/028994

PCT Pub. Date: Feb. 10, 2022

(65) Prior Publication Data

US 2023/0263212 A1 Aug. 24, 2023

(30) Foreign Application Priority Data

Aug. 4, 2020 (EP) .................................... 20189312

(51) Int. Cl.
*A24D 1/20* (2020.01)
*A24D 1/02* (2006.01)
(Continued)

(52) U.S. Cl.
CPC ................. *A24D 1/20* (2020.01); *A24D 1/02* (2013.01); *A24D 1/045* (2013.01); *A24D 3/17* (2020.01);
(Continued)

(58) Field of Classification Search
CPC ..................................................... A24F 40/465
See application file for complete search history.

(56) References Cited

U.S. PATENT DOCUMENTS 4,384,671 A 5/1983 Hayes
6,246,333 B1 6/2001 Doner et al.
(Continued)

FOREIGN PATENT DOCUMENTS

CN 108991603 A 12/2018
JP 2019525725 A 9/2019
(Continued)

OTHER PUBLICATIONS

Search Report dated Jul. 31, 2024 from the Office Action for Taiwanese Application No. 110128670, 2 pages.
(Continued)

*Primary Examiner* — Philip Y Louie
*Assistant Examiner* — Daniel Edward Vakili
(74) *Attorney, Agent, or Firm* — Lerner David LLP

(57) ABSTRACT

An aerosol generating article includes a shell that extends along a first axis; a material part disposed inside the shell, wherein the material part includes a substrate for generating an aerosol and one or more inductively heatable susceptors for heating the substrate; and a conductive loop that is spaced from the material part along the first axis and is configured to produce, when in the presence of an oscillating magnetic field aligned substantially along the first axis, a reverse magnetic field aligned oppositely to the oscillating magnetic field.

16 Claims, 3 Drawing Sheets

(51) Int. Cl.

| | |
|---|---|
| ***A24D 1/04*** | (2006.01) |
| ***A24D 3/17*** | (2020.01) |
| ***A24F 40/20*** | (2020.01) |
| ***A24F 40/465*** | (2020.01) |
| ***H05B 6/10*** | (2006.01) |

(52) U.S. Cl.

CPC ............ *A24F 40/20* (2020.01); *A24F 40/465* (2020.01); *H05B 6/108* (2013.01)

(56) References Cited

U.S. PATENT DOCUMENTS

| | | | |
|---|---|---|---|
| 6,748,680 | B2 | 6/2004 | Pahlke et al. |
| 2018/0007972 | A1 | 1/2018 | Thorens |
| 2018/0206552 | A1 | 7/2018 | Sebastian et al. |

FOREIGN PATENT DOCUMENTS

| | | | | |
|---|---|---|---|---|
| WO | 9527411 | A1 | 10/1995 | |
| WO | 2015097005 | A1 | 7/2015 | |
| WO | 2015176898 | A1 | 11/2015 | |
| WO | WO-2019129639 | A1 * | 7/2019 | ............ A24F 40/42 |
| WO | 2019219740 | A1 | 11/2019 | |
| WO | 2020109203 | A1 | 6/2020 | |
| WO | 2020120271 | A1 | 6/2020 | |
| WO | 2020127122 | A1 | 6/2020 | |

OTHER PUBLICATIONS

International Search Report for PCT/EP2021/071216 mailed Nov. 2, 2021. 4 pgs.

International Search Report for Application No. PCT/EP2021/071215 mailed Oct. 28, 2021, pp. 1-4.

International Search Report for PCT/EP2021/071217 mailed Nov. 9, 2021. 4 pgs.

* cited by examiner

AEROSOL GENERATING DEVICE

CROSS-REFERENCE TO RELATED APPLICATIONS

The present application is a national phase entry under 35 U.S.C. § 371 of International Application No. PCT/EP2021/071216, filed Jul. 28, 2021, published in English, which claims priority to European Application No. 20189312.0 filed Aug. 4, 2020, the disclosures of which are incorporated herein by reference.

FIELD OF THE INVENTION

The invention relates to an aerosol generating article for producing an aerosol for inhalation by a user, and to an aerosol generating system that incorporates said article.

BACKGROUND

Aerosol generating devices have become popular as alternatives to traditional combustible tobacco products. Heated tobacco products, also referred to as heat-not-burn products, are one class of aerosol generating device that are configured to heat a tobacco substrate to a temperature that is sufficient to produce an aerosol from the substrate but is not so high that the tobacco combusts. Although this specification makes reference to heated tobacco products in particular, it will be appreciated that the discussion that follows applies equally to aerosol generating systems that incorporate other kinds of heatable substrate.

In some heated tobacco products, the tobacco substrate is heated by one or more inductively heatable susceptors located inside the article. When the article is placed inside an oscillating magnetic field, the susceptors couple to the magnetic field and produce heat, which in turn heats the substrate. The rate at which the substrate is heated depends on the intensity of the magnetic field at the position of the susceptors, but safety concerns regarding the strength of the electromagnetic field to which the user is exposed limit the strength of the magnetic field that can be generated by such devices, and hence limit the rate of heating that can be achieved.

There is hence a need for a way of rapidly heating an aerosol generating substrate while avoiding exposing the user to excessively strong electromagnetic fields.

SUMMARY OF THE INVENTION

A first aspect of the invention provides an aerosol generating article comprising: a shell that extends along a first axis; a material part disposed inside the shell, wherein the material part comprises a substrate for generating an aerosol and one or more inductively heatable susceptors for heating the substrate; a conductive loop that is spaced from the material part along the first axis and is configured to produce, when in the presence of an oscillating magnetic field aligned substantially along the first axis, a reverse magnetic field aligned oppositely to the oscillating magnetic field.

The opposing magnetic field produced by the conductive loop has the effect of the reducing the intensity of the net magnetic field outside in the region surrounding the article. As a result, when the article is inductively heated by an oscillating magnetic field (supplied, for example, by a coil inside of which the article is placed), the intensity of the electromagnetic field to which the user is exposed is reduced relative to that which would be experienced without the conductive loop in place. The invention provides a further advantage in that it eliminates the need for electromagnetic shielding in the device that provides the oscillating magnetic field, thereby allow the construction of the device to be simplified.

The conductive loop can be formed of any suitable conductive material, for example copper, silver or aluminium. The conductive loop can be any conductive structure that permits a current to circulate about the first axis in order to establish the opposing magnetic field.

In some preferred embodiments the conductive loop is shaped either as a ring that lies in a plane substantially perpendicular to the first axis or as a hollow cylinder having its cylindrical axis aligned substantially with the first axis. As a result, the aperture of the ring or cylinder will be aligned along the same direction as the airflow channel, minimising the obstruction of the channel by the conductive loop. The ring or cylinder could have a solid surface, but could alternatively be formed by a grid or mesh of a conductive material.

Preferably the conductive loop comprises a metal, most preferably copper or silver. The conductive loop could incorporate other conductive materials, however, such as graphite or a conducting polymer. Metals, in particular copper and silver, are typically highly conductive and are thus capable of efficiently generating strong opposing magnetic fields when placed in an oscillating primary field. Moreover, highly conductive materials such as metals are favoured as this prevents the current induced in the conductive loop from producing excessive amounts of heat by resistive heating.

In some preferred embodiments, the conductive loop is integral with the shell. For example, the conductive loop could be a layer of conductive material inside the shell, or could be applied to the exterior of the shell. In other preferred embodiments, the conductive loop is carried by a tipping paper disposed on an exterior surface of the shell. In the latter case, the conductive loop could be integral with the tipping paper (for example as a layer inside the tipping paper or applied to the exterior of the tipping paper).

The aerosol generating article preferably comprises a filter for filtering the aerosol generated by the substrate. The filter may be disposed inside the airflow channel, for example. The filter may be configured to filter any potentially harmful substances from the aerosol, and may cool the aerosol passing through it. In particularly preferred embodiments, the conductive loop is disposed between the material part and the filter.

In preferred embodiments, the one or more inductively heatable susceptors comprise a first material and the conductive loop comprises a second material having a lower resistivity than the first material. It is advantageous that the conductivity of the conductive loop is high, since this ensures that the opposing magnetic field is comparatively strong and minimises heating of the loop due to the induced current. On the contrary, it is advantageous that the conductivity of the material of the inductively heatable susceptors is comparatively low, since it is desirable that the susceptors heat rapidly in the presence of an oscillating magnetic field. For example, the first material could be aluminium, and the second material could be copper. In other embodiments, however, the first and second materials could be the same. For example, both could be aluminium.

A second aspect of the invention provides an aerosol generating system comprising: an aerosol generating article in accordance with the first aspect of the invention; and a heating device comprising an inductor for producing an oscillating magnetic field aligned substantially along the first axis for heating the one or more inductively heatable susceptors. The heating device could be a hand-held device that facilitates consumption of the generated vapour by inhalation, and could include features such as an electrical power source for powering the inductor and a mouthpiece in fluid communication with the chamber whereby the aerosol can be drawn from the article by a user. As was explained above, the presence of a conductive loop in the aerosol generating article allows the construction of the heating device to be simplified, since the heating device does not need to be provided with electromagnetic shielding in order to protect the user from high electromagnetic fields.

In preferred implementations, the heating device comprises a chamber adapted to receive the aerosol generating article and hold the aerosol generating article in the oscillating magnetic field.

Advantageously, the inductor comprises an electrically-powered coil, for example a helical coil. The magnetic field produced inside such a coil as a current is passed through it can be strong and highly uniform, since the field lines run parallel to one another along the axis about which the coil is wound. As such, the coil can be adapted such that the aerosol generating article can be disposed inside of it, preferably such that the airflow channel is concentric with the coil.

BRIEF DESCRIPTION OF THE DRAWINGS

Examples of aerosol generating articles and an aerosol generating system will now be described with reference to the accompanying drawings, in which.

DETAILED DESCRIPTION

Figure 1:
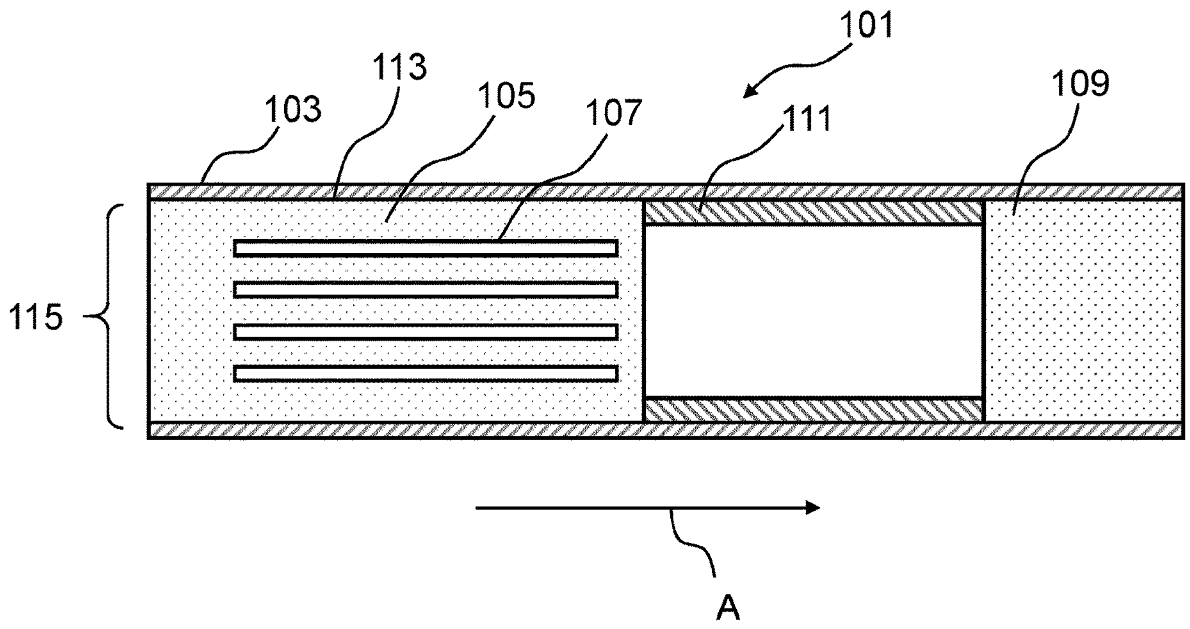
FIG. 1 is a cross-sectional view of a first embodiment of an aerosol generating article in accordance with the first aspect of the invention.

FIG. 1 is a cross-sectional view of an aerosol generating article 101 in accordance with the first aspect of the invention. The article 101 is enclosed by a cylindrical shell 103, which defines an airflow channel 115. The airflow channel 115 extends along a first axis, which is oriented along the direction labelled A in this drawing.

Inside the shell 103 at one end of the airflow channel 115 is a material part 113. The material part 113 includes substrate 105, which comprises a material such as reconstituted tobacco which, when heated, generates an aerosol for consumption by inhalation. The material part 113 also includes a plurality of inductively heatable susceptors 107 that are embedded in the substrate 105. The susceptors 107 could be made of aluminium, for example. Other suitable materials include iron, nickel, stainless steel, or an alloy (e.g. nickel chromium or nickel copper). In this example, each susceptor 107 has the form of an elongate strip or rod that is arranged to extend along the airflow channel 115 in the direction of the first axis A.

At the other end of the airflow channel 115 is a filter 109. When the aerosol generated by the substrate 105 is drawn through the airflow channel 115 along the direction of the first axis A, it passes through the filter 109, which causes the aerosol to cool. The filter 109 may also be configured to filter any unwanted or potentially harmful substances from the aerosol.

Figure 2:
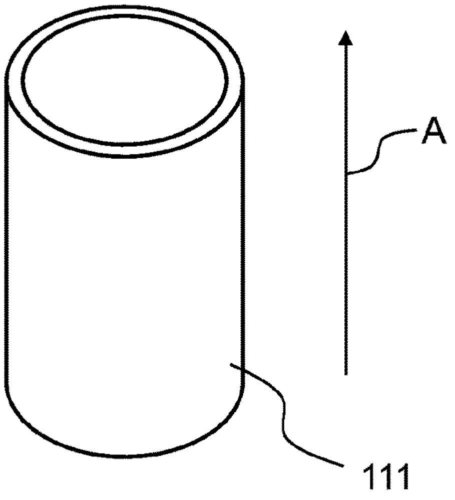
FIG. 2 shows an exemplary conductive loop suitable for incorporating in the aerosol generating article of FIG. 1.

A conductive loop in the form of a hollow cylinder 111 is disposed inside the airflow channel 115 between the material part 113 and the filter 109. The cylinder 111 is formed of a conductive material, for example copper, which preferably has a lower resistivity than the material of which the susceptors 107 are formed. The cylinder 111 is spaced from the material part 113 along the first axis such that it and the material part 113 do not overlap one another along the first axis. FIG. 2 shows most clearly the structure of the cylinder 111.

When the article 101 is placed in an oscillating magnetic field that has at least a substantial component aligned along the direction A of the first axis, the susceptors 107 experience resistive heating due to eddy currents induced in them and/or heat released when as permanent magnetisation of the susceptors is continuously altered by the changing magnetic field. This causes the substrate 105 to heat and hence produce the aerosol. At the same time, the changing magnetic field induces a current in the cylinder 111, which circulates about the first axis and hence produces a magnetic field that opposes the original magnetic field. Because the material part 113 and the cylinder 111 are spaced from one another along the first axis, the original magnetic field remains comparatively strong at the location of the susceptors 107 and can hence achieve a high rate of heating. Outside of the article 111, however, the opposing magnetic field substantially reduces the net intensity of the magnetic field and hence prevents the user being exposed to an unacceptably high strength of electromagnetic field. This principle will be further illustrated later with reference to FIG. 6, which shows a particular example of the arrangement of a magnetic field source in relation to the article 101 in an aerosol generating system.

Figure 3:
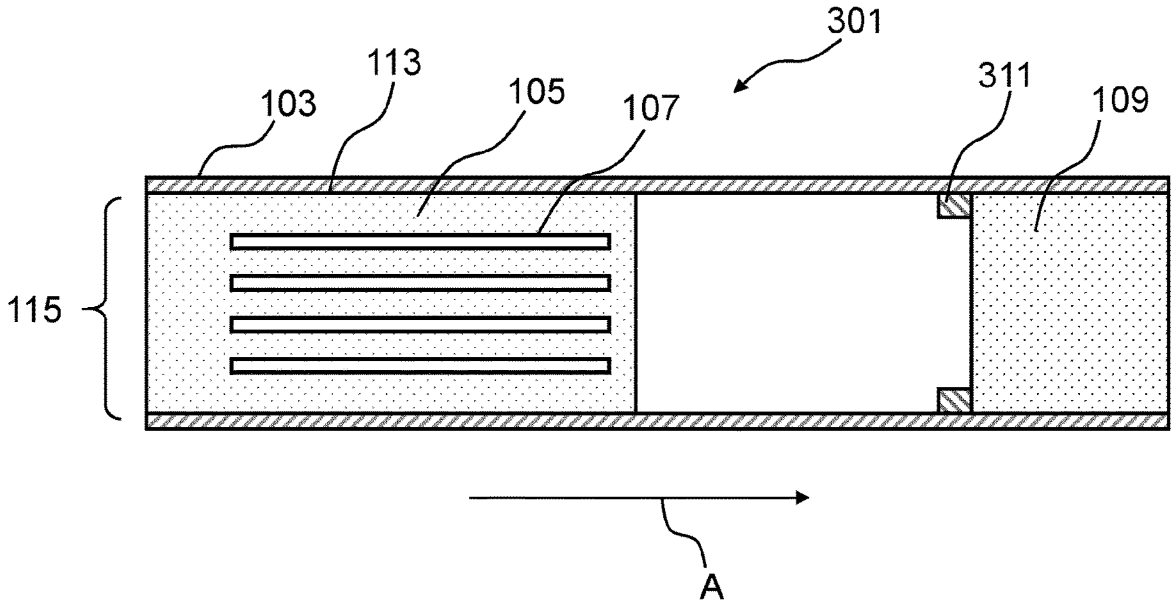
FIG. 3 is a cross-sectional view of a second embodiment of an aerosol generating article in accordance with the first aspect of the invention.

FIG. 3 is a cross-sectional view of a second embodiment of an aerosol generating article 301 in accordance with the first aspect of the invention. The aerosol generating article 301 includes a shell 103, airflow channel 115, material part 113 and filter 109 all as described above with reference to FIG. 1. In this example, however, the conductive loop is provided by a ring 311 disposed inside the airflow channel 115 between the material part 113 and the filter 109. The ring 311 lies in a plane perpendicular to the first axis such that its aperture is aligned with the airflow channel 115. Like the cylinder 111 described above, the ring 311 is preferably made of a material with a lower resistivity than the susceptors 107, for example copper. Although the ring is shown in this example as being directly adjacent to the filter 109, it could be positioned anywhere in the space between the material part 113 and the filter 109, or could be arranged to encircle the filter 109. It could also be positioned at either of the ends of the article. More than one ring 311 could be provided.

Figure 4:
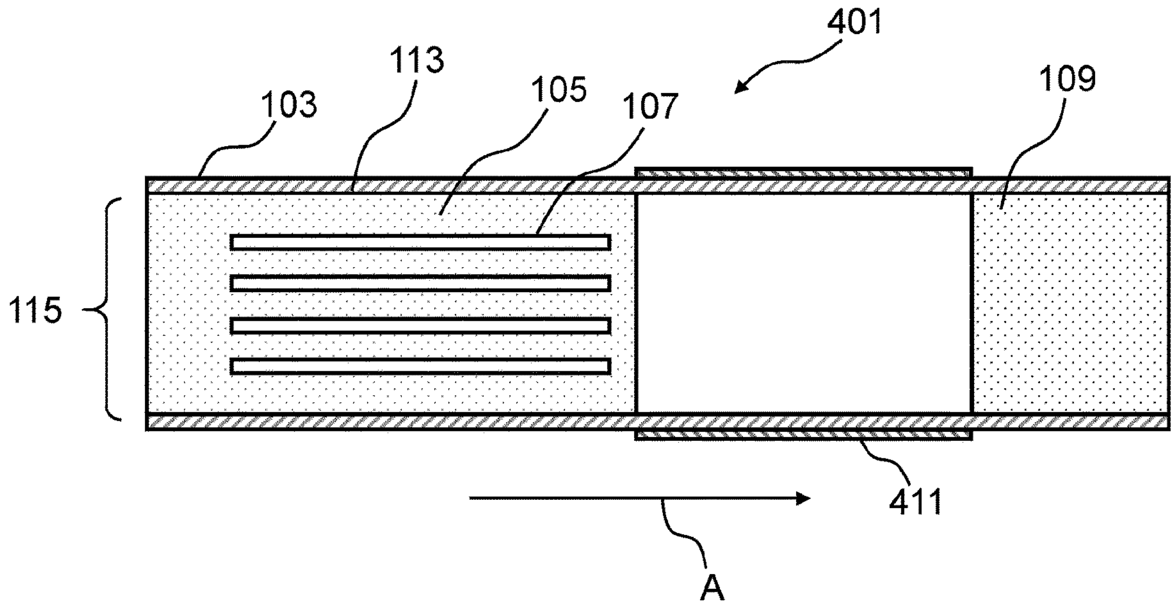
FIG. 4 is a cross-sectional view of a third embodiment of an aerosol generating article in accordance with the first aspect of the invention.

FIG. 4 shows a third embodiment of an aerosol generating article 401 in accordance with the first aspect of the invention. Again, this embodiment includes all of the components of the aerosol generating article 101 of FIG. 1 except for the cylinder 111. Instead, the conductive loop is provided by a foil 411 that is an integral layer of the shell 103. The foil 411 is formed of a conductive material, for example copper or another metal, and extends around the complete circumference of the shell 103. Although in the example the foil 411 is shown on the exterior of the shell 103, it could be covered by additional layers of material (e.g. paper) comprised by the shell. As an alternative to a foil 411, the conductive loop in this example could be provided by a grid, frame or mesh of the conductive material. What is important is that the conductive loop, whether provided as the foil 411 or otherwise, permits a current to circulate about the axis of the airflow channel 211.

A similar configuration to that shown in FIG. 4 could be achieved by applying the foil 411 to the shell 103 after the manufacture of the shell 103 or that of the article 401 as a whole.

Figure 5:
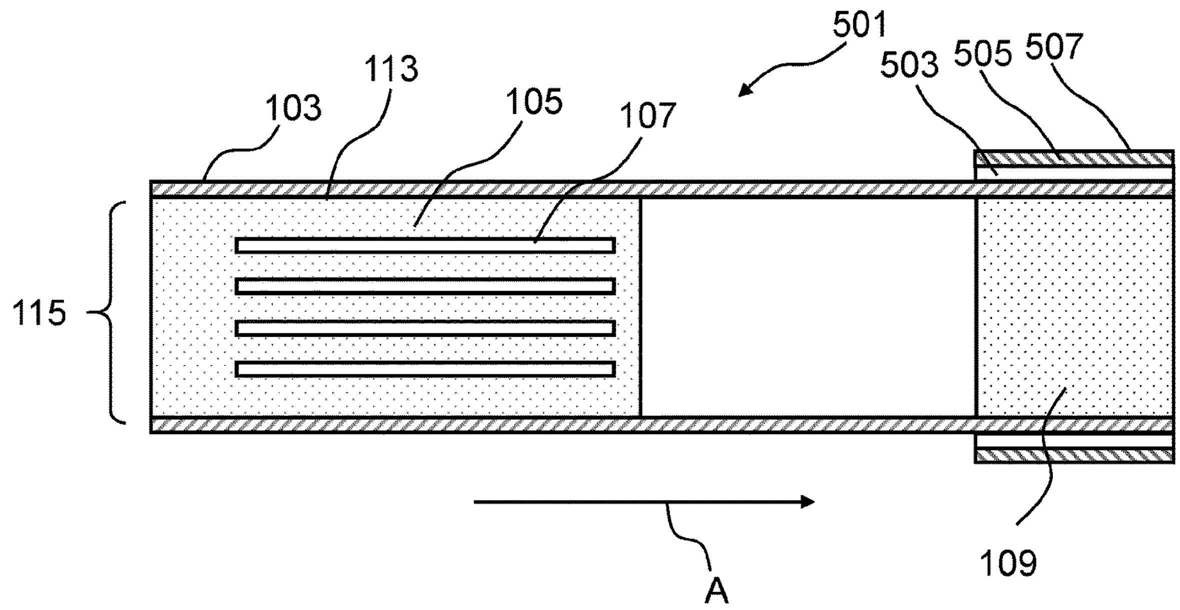
FIG. 5 is a cross-sectional view of a fourth embodiment of an aerosol generating article in accordance with the first aspect of the invention.

FIG. 5 shows a fourth embodiment of an aerosol generating device 501 in accordance with the first aspect of the invention. Like in the previous examples, the aerosol generating article 501 includes a shell 103, material part 113 and filter 109 arranged in the manner described above. In this example, a conductive loop is provided by a conductive layer 503 that is carried by a tipping paper 507 that is applied to the exterior of the shell 103 at the position of the filter 109. The conductive layer 503 could be a metal foil or mesh, and could be made of copper, for example. The conductive layer 503 is covered by a surface layer 505, for example a paper layer that has the appearance of the tipping paper on a conventional cigarette.

Figure 6:
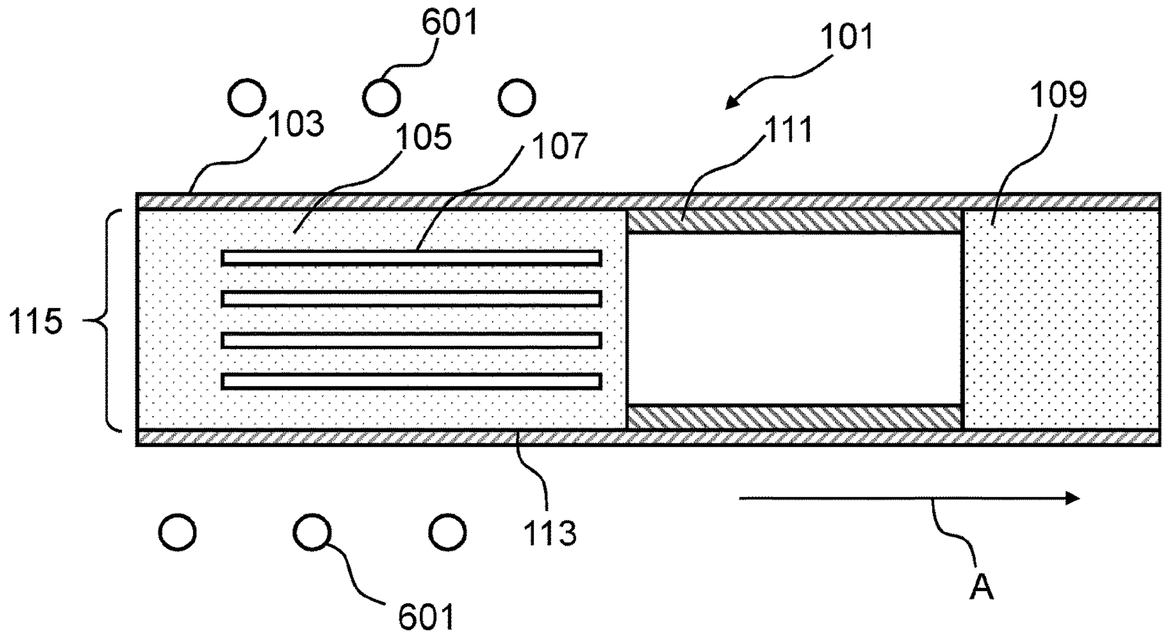
FIG. 6 is a cross-sectional view of an aerosol generating system in accordance with the second aspect of the invention.

FIG. 6 is a cross-sectional view of part of an aerosol generating system in accordance with the second aspect of the invention. The system includes an inductor 601, which has the form of a helical coil. An aerosol generating article 101 as described above with reference to FIG. 1 is disposed inside the inductor, and is arranged such that the cylindrical shell 103 and the inductor 601 are concentric about the first axis. When an alternating current is passed through the inductor 601, an oscillating magnetic field aligned along the direction of the first axis is produced. As was explained above, this magnetic field causes the susceptors 107 in the material part 113 to heat and thus heats the substrate 105. The oscillating magnetic field also induces a current that circulates about the first axis in the conductive cylinder 111, which gives rise to an opposing magnetic field.

The magnetic field produced by the inductor 601 is strongest inside the coil, where the susceptors 107 are positioned. Since the cylinder 109 is spaced from the material part along the first axis, the opposing magnetic field is less strong at the position of the susceptors 107. As a result, there susceptors experience a substantial net magnetic field despite the existence of the opposing magnetic field. Outside of the coil, however, at positions that are at comparable distances from the inductor 601 and the cylinder 109, the magnitudes of the original and opposing magnetic fields are closer to one another. The net magnetic field at positions outside of the article 101 and inductor 601 is therefore reduced in magnitude relative to what it would be without the presence of the conductive loop provided by the cylinder 109.

The inductor 601 shown in FIG. 6 is part of a heating device, which could also include additional features such as a power source for powering the inductor 601, a chamber that contains the inductor 601 and from which the aerosol generating article 101 can be removed when spent, and a mouthpiece the allows the user to draw air through the airflow channel 115 in order to consume the aerosol produced by the substrate 105. Although aerosol generating system in this example includes the aerosol generating article 101 of FIG. 1, this could be substituted for any of the other exemplary aerosol generating articles described herein.

The invention claimed is:

1. An aerosol generating article comprising:

a shell that extends along a first axis;

a material part disposed inside the shell, wherein the material part comprises a substrate for generating an aerosol and one or more inductively heatable susceptors for heating the substrate;

a conductive loop that is spaced from the material part along the first axis and is configured to produce, when in the presence of an oscillating magnetic field aligned substantially along the first axis, a reverse magnetic field aligned oppositely to the oscillating magnetic field.

2. The aerosol generating article of claim 1, wherein the conductive loop is shaped either as a ring that lies in a plane substantially perpendicular to the first axis or as a hollow cylinder having a cylindrical axis aligned substantially with the first axis.

3. The aerosol generating article of claim 1, wherein the conductive loop comprises a metal.

4. The aerosol generating article of claim 3, wherein the metal is copper.

5. The aerosol generating article of claim 1, wherein the conductive loop is integral with the shell.

6. The aerosol generating article of claim 1, wherein the conductive loop is carried by a tipping paper disposed on an exterior surface of the shell.

7. The aerosol generating article of claim 1, further comprising a filter for filtering the aerosol generated by the material part.

8. The aerosol generating article of claim 7, wherein the conductive loop is disposed between the material part and the filter.

9. The aerosol generating article of claim 1, wherein the one or more inductively heatable susceptors comprise a first material and the conductive loop comprises a second material having a lower resistivity than the first material.

10. The aerosol generating article of claim 9, wherein the first material is a metal.

11. The aerosol generating article of claim 10, wherein the metal is aluminium.

12. The aerosol generating article of claim 10, wherein the second material is a metal.

13. The aerosol generating article of claim 12, wherein the metal of the second material is copper.

14. An aerosol generating system comprising:

the aerosol generating article of claim 1; and a heating device comprising an inductor for producing an oscillating magnetic field aligned substantially along the first axis for heating the one or more inductively heatable susceptors.

15. The aerosol generating system of claim 14, wherein the heating device comprises a chamber adapted to receive the aerosol generating article and hold the aerosol generating article in the oscillating magnetic field.

16. The aerosol generating system of claim 14, wherein the inductor comprises an electrically-powered coil.

* * * * *